March 12, 1968        W. G. NEWTON        3,372,952

SEAL

Filed Oct. 17, 1966

INVENTOR
WILLIAM G. NEWTON
BY
*Salvatore G. Militana*
*attorney*

United States Patent Office 3,372,952
Patented Mar. 12, 1968

3,372,952
SEAL
William G. Newton, Lubbock, Tex., assignor to No-vak, Inc., Miami, Fla., a corporation of Florida
Filed Oct. 17, 1966, Ser. No. 587,118
2 Claims. (Cl. 292—307)

This invention is directed to seals.

It is the function of seals to lock items such as meters, cabinets, freight cars and the like to prevent persons from tampering therewith without detection. However, since these items have to be inspected or otherwise opened periodically, the seals are destroyed during the opening of the particular item and then when the item concerned is closed again, a new seal must be used. In the instance of meters of public utility companies the cost of replacing the used seals is enormous. The present invention contemplates reducing this cost by utilizing a replaceable seal of which only a small portion is destroyed and not reused when officially opened.

Therefore, a principal object of the present invention is to provide a seal which may be reused and still function as a seal to indicate any tampering therewith.

Another object of the present invention is to provide a seal whose major portion may be reused many times without losing its effectiveness to indicate if unauthorized persons have tampered with the seal.

A further object of the present invention is to provide a seal with a rivet which must be removed and otherwise destroyed in the breaking of the seal and yet permits using the seal again with a new rivet.

A still further object of the present invention is to provide a reusable seal which is simple in construction, inexpensive in its original cost as well as in its capability of being reused many times yet is most effective to indicate upon casual inspection any tampering therewith if such had occurred.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended clams.

Figure 1:
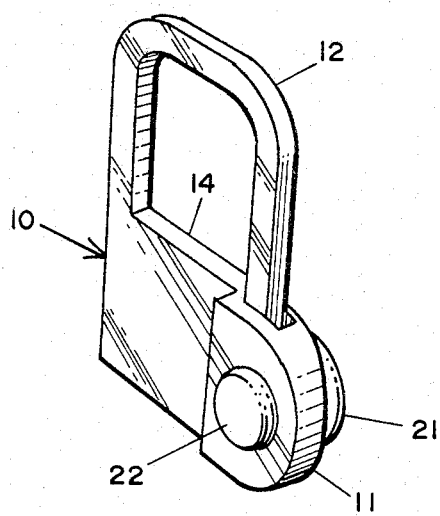
FIGURE 1 is a perspective view of a plastic seal constructed in accordance with my invention.
Figure 3:
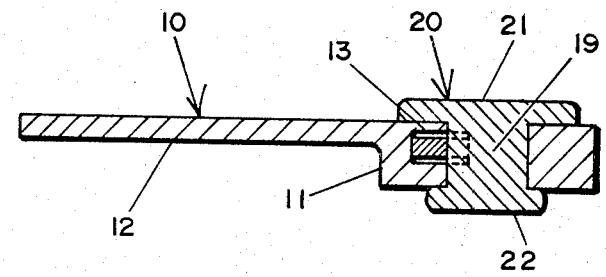
Figure 2:
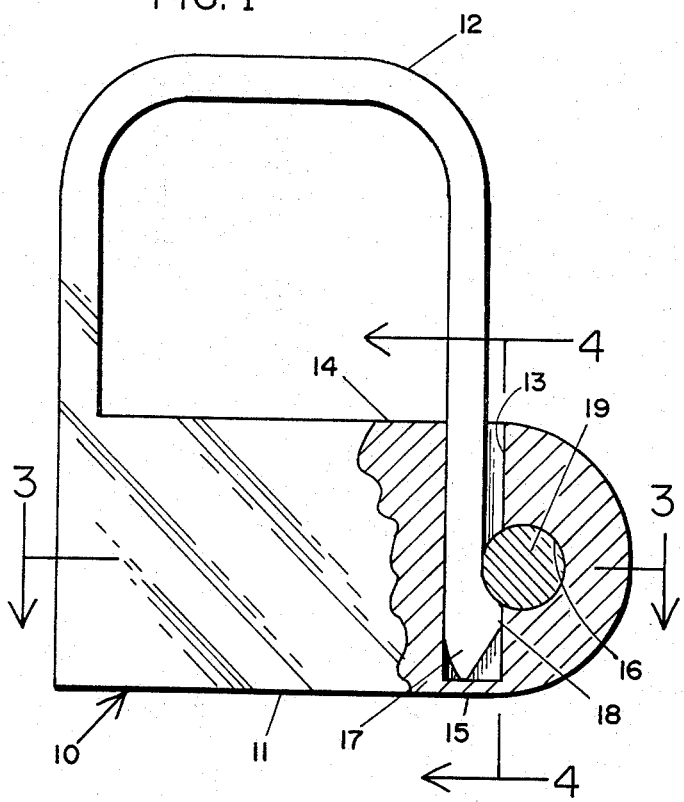
FIGURE 2 is a plan view with parts broken away.
Figure 4:
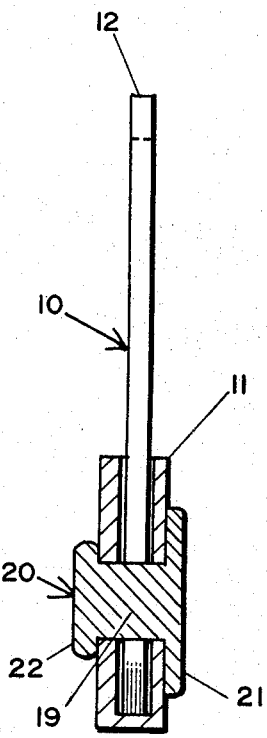

FIGURES 3 and 4 are cross sectional views taken along 3—3 and 4—4 respectively of FIGURE 2.

Referring to the drawing wherein like numerals are used to designate similar parts throughout the several views, the numeral 10 refers to a seal constructed in accordance with my invention and consisting of a body member 11 having an elongated and looped strap 12 extending from one end thereof. Along the other end of the body member 12 is a slot 13 extending longitudinally from the inner edge 14 of the body member 11 and terminating at an end wall 15 at the outer edge portion of the body member 11. At the mid-portion of the body member 11 is a transversely disposed bore 16. A portion of the bore 16 extends into the slot 13 so that the bore 16 and slot 13 communicate with each other.

The slot 13 receives a free end 17 of the elongated strap 12 which is provided with a ridge portion 18. It is to be noted that the strap 12 is more narrow than that of the slot 13 but at the position of the ridge portion 18, the strap 12 is only slightly more narrow than the slot 13 so that the strap 12 at the ridge portion 18 engages the walls of the slot 13. When the free end portion 17 of the strap 12 is inserted into the slot 13 and engages the end wall 15, the ridge portion 18 will be positioned adjacent to and inwardly of the bore 16. The ridge portion 18 forms an abutment or shoulder which is engaged by the body portion 19 of a rivet 20. The rivet 19 is provided with a head 21 with its other end upset or peened as at 22 by an instrument to secure the rivet 20 in position thereon.

Although any suitable material may be used in the manufacture of my seal 10, I prefer to produce it of Delrin which is a rigid plastic. The rivet 20 may be made of such materials as lead or a soft plastic that is suitable for brading or upsetting with a hand tool and embossed to include an identifying number or lettering. The body member 11 likewise will have imprinted thereon lettering and or numbers to identify the user of the seal and the serial number thereof.

In the normal use of my seal 10 as with all other seals, the strap 12 is inserted into the article being protected and the free end 17 of the strap is then inserted into the slot 13 until it engages the end wall 15. The rivet 20 is then inserted into the bore 16 and the free end of the body portion 19 of the rivet 20 will extend beyond the body member 11 of the seal 10. With a pincer-like hand tool, the free end of the rivet 20 will be upset to secure the rivet 20 on the seal 10. The shoulder 18 of the strap 12 will engage the rivet 20 so that the strap 12 cannot be pulled out of the slot 13; any excessive pull on the strap 12 will break it. The only other way of disengaging the seal from the device it is protecting is to punch out the rivet 20. In either of these instances, evidence of tampering with the seal 10 will be very obvious and ascertainable. The rivet 20 will have certain identifying markings that either cannot be readily duplicated or the identifying markings being known only to the legitimate user of the seal 20 whereby it will prevent the pilferer from destroying the rivet 20 to open the seal 10 and then replacing the rivet with one of his own in the attempt to escape detection.

On the other hand, my seal 10 permits the user thereof to reuse the seal 10 as often as necessary. All he need do when he wishes to gain access to the item being protected by the seal 10 is to punch out the rivet 20 that is mounted on the seal 10 which permits him to remove the seal from the item. Then when the same seal 10 is replaced on the item being protected, he inserts a new rivet 20 and with the aforementioned hand tool, he upsets the end of the rivet 20 to lock the seal 10.

Having disclosed my invention, what I claim as new and desire to secure by Letters Patent of the United States is:

1. A seal comprising a body member, an elongated strap portion extending from said body member and forming a loop, said elongated strap portion having a free end portion extending in the direction of said body member, shoulder means mounted on said free end portion of said elongated strap portion, said body member having a longitudinally disposed slot, said slot having side walls and an end wall and receiving said free end portion of said elongated strap portion, said body member having a transversely disposed bore extending therethrough, said last named bore communicating with said slot in proximity of said shoulder means, and rivet means mounted in said bore and extending into said slot and engaging said shoulder means whereby said elongated strap portion is prevented from being withdrawn from said body member.

2. The structure as recited by claim 1 wherein said elongated strap portion extends from one edge portion of said body member, said free end portion extends in the direction of another edge portion of said body member and said longitudinally disposed slot extends along said other edge portion of said body member.

References Cited

UNITED STATES PATENTS 306,524   10/1884   Reeve _____ 292—329
1,311,500  7/1919   Dresser _____ 292—327
1,937,743  12/1933  Brooks _____ 292—307

FOREIGN PATENTS 226,146   2/1963   Austria.

MARVIN A. CHAMPION, *Primary Examiner.*

E. J. McCARTHY, *Assistant Examiner.*